United States Patent [19]

Erwied et al.

[11] Patent Number: 4,590,233

[45] Date of Patent: May 20, 1986

[54] STABILIZATION OF POLYVINYL CHLORIDE

[75] Inventors: Werner Erwied, Langenfeld; Bernd Wegemund, Haan; Peter Wedl, Loxstedt-Bexhövede; Kurt Worschech, Loxstedt, all of Fed. Rep. of Germany

[73] Assignee: Henkel Kommanditgesellschaft auf Aktien, Düsseldorf-Holthausen, Fed. Rep. of Germany

[21] Appl. No.: 681,939

[22] Filed: Dec. 14, 1984

Related U.S. Application Data

[63] Continuation of Ser. No. 581,658, Feb. 21, 1984, abandoned, which is a continuation of Ser. No. 361,402, Mar. 24, 1982, abandoned.

[30] Foreign Application Priority Data

Apr. 3, 1981 [DE] Fed. Rep. of Germany ....... 3113442

[51] Int. Cl.$^4$ ................................................ C08K 5/07
[52] U.S. Cl. ...................................... 524/357; 524/99; 524/104; 524/450
[58] Field of Search ................... 524/99, 104, 357, 450

[56] References Cited

U.S. PATENT DOCUMENTS

| | | | |
|---|---|---|---|
| 4,000,100 | 12/1976 | Baldyga | 524/450 |
| 4,102,839 | 7/1978 | Crochemore et al. | 524/357 |
| 4,116,907 | 9/1978 | Shiohara et al. | 524/357 |
| 4,123,399 | 10/1978 | Gay | 524/357 |
| 4,221,687 | 9/1980 | Minagawa et al. | 524/357 |
| 4,267,083 | 5/1981 | Torlotting | 524/357 |
| 4,290,940 | 9/1981 | Wirth et al. | 524/105 |
| 4,338,226 | 7/1982 | Worschech et al. | 524/450 |
| 4,371,656 | 2/1983 | Kashiwase et al. | 524/450 |

FOREIGN PATENT DOCUMENTS

| | | |
|---|---|---|
| 2356695 | 1/1978 | Fed. Rep. of Germany . |
| 2728865 | 7/1979 | France . |

OTHER PUBLICATIONS

European Patent Office Application No. 5678.

*Primary Examiner*—Veronica P. Hoke
*Attorney, Agent, or Firm*—Hammond, Littell, Weissenberger & Dippert

[57] ABSTRACT

In a stabilized polyvinyl chloride molding mixture containing a stabilizer combination based upon alkali metal, alkaline earth metal, and/or zinc soaps, co-stabilizers, powdered, crystalline, hydrous aluminosilicate, and flow promoters, as well as optionally additional conventional additives, the improvement which comprises, per 100 parts by weight of polyvinyl chloride, (a) from about 0.2 to 5 parts by weight of a synthetic, crystalline, powdered alkali metal aluminosilicate containing from about 13 to 25 percent by weight of water of crystallization; and (b) from about 0.1 to 5 parts by weight of at least one co-stabilizer selected from the group consisting of β-diketones, α-ketoenol esters, α-acyllactones, substituted 1,4-dihydropyridine-3,5-dicarboxylic acids, and pyrrole, the pyrrole being unsubstituted or substituted.

13 Claims, No Drawings

STABILIZATION OF POLYVINYL CHLORIDE

This is a continuation of co-pending U.S. patent application Ser. No. 581,658, now abandoned filed Feb. 21, 1984, which in turn is a continuation of U.S. patent application Ser. No. 361,402, filed Mar. 24, 1982, now abandoned.

FIELD OF THE INVENTION

This invention is directed to the stabilization of polyvinyl chloride molding mixtures. More particularly, this invention is directed to a process for stabilizing molding mixtures based upon polyvinyl chloride, vinyl chloride copolymers, or mixtures of polyvinyl chloride or vinyl chloride copolymers with other polymers which comprises adding thereto alkali metal aluminosilicates and one or more co-stabilizers.

BACKGROUND OF THE INVENTION

Lead, tin, or barium/cadmium compounds, generally in admixture with co-stabilizers, i.e., secondary stabilizers, flow promoters, and other conventional additives, are used primarily as stabilizers in the manufacture of polyvinyl chloride articles. These heavy metal stabilizers have a very satisfactory effect in practice; however, certain doubts exist concerning their use, particularly with respect to occupational physiology, i.e., toxicology. For this reason, attempts have been made for a long time to replace the normally used heavy metal stabilizers with less objectionable substances. The use of soaps of alkali metals, alkaline earth metals, or zinc in place of the heavy metal stabilizers has already been suggested. In this regard, the use of calcium soaps, which may be supplemented with co-stabilizers such as zinc stearate, imino compounds, or epoxy compounds, is preferred.

The stabilizing effect of such light metal soap systems is relatively weak in comparison to that of the heavy metal compounds. Molded articles manufactured with the use of such stabilizer systems frequently exhibit dark discolorations and have a low reserve stability. Consequently, the scope of application of such stabilizer systems is quite limited.

In U.S. Pat. No. 4,220,570 a stabilizer combination is described which contains in addition to calcium and/or zinc soaps, especially the stearates, a partial ester of pentaerythritol with a fatty acid having from 12 to 22 carbon atoms, a waxy hydrocarbon, and/or a free fatty acid having from 12 to 22 carbon atoms, as well as an antioxidant. However, this combination is not as effective as stabilizer systems based upon heavy metal compounds.

In U.S. Pat. No. 4,000,100 the use of so-called non-activated zeolite A in stabilizer systems for resin compounds based upon polyvinyl chloride, is disclosed. A significant aspect of the teaching of this reference is the realization that by incorporation of certain hydrous zeolite types in stabilizer systems, synergistic action increases with respect to thermal and light protection can be achieved. The zeolites proposed for this purpose are those of types 3A, 4A, and 5A. They are to be used with any desired inorganic, organometallic, or organic stabilizers or stabilizer components.

Co-pending U.S. patent application Ser. No. 194,851, filed Oct. 7, 1980 now U.S. Pat. No. 4,338,226, issued July 6, 1982, is directed to the stabilization of polyvinyl chloride molding mixtures by means of a complex system of primary and secondary stabilizers for polyvinyl chloride mixtures together with a powdered, crystalline, synthetic hydrous sodium aluminosilicate. More particularly, this application is directed to stabilizing molding compositions based upon polyvinyl chloride by incorporation therein, per 100 parts of polymer, (a) from about 0.2 to 5 parts by weight of a synthetic, crystalline sodium aluminosilicate of small particle size and containing from about 13 to 25 percent by weight of water of crystallization, which has the composition

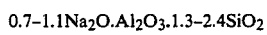

0.7–1.1Na$_2$O.Al$_2$O$_3$.1.3–2.4SiO$_2$ with respect to the anhydrous form;

(b) from about 0.05 to 1.5 parts by weight of one or more calcium salts of fatty acids with from 8 to 22 carbon atoms;

(c) from about 0.05 to 0.5 parts by weight of one or more zinc salts of fatty acids with from 8 to 22 carbon atoms;

(d) from about 0.2 to 2.0 parts by weight of partial esters of polyols with from 2 to 6 carbon atoms and from 2 to 6 hydroxyl groups and fatty acids with from 8 to 22 carbon atoms, which contain an average of at least one free polyol-hydroxyl group per molecule; and (e) from about 0.1 to 10 parts by weight of thioglycolic acid esters of polyols with from 2 to 6 hydroxyl groups and/or thioglycolic acid esters of monofunctional alcohols with from 8 to 22 carbon atoms.

The processing properties of polyvinyl chloride molding mixtures stabilized in the above manner compare to the properties of similar mixtures stabilized with heavy metals. This is particularly true of the initial color, the initial stability, and the residual stability of the molding compounds. However, the sulfur containing mixing component (e), the thioglycolate, can lead to problems for certain applications, for example, for packaging materials in the food sector. Since component (e) plays an important functional role in the stabilizer system mentioned in said U.S. patent application, component (e) cannot merely be deleted.

OBJECTS OF THE INVENTION

It is an object of the present invention to develop a stabilizer combination for addition to moldable compositions based upon polyvinyl chloride or vinyl chloride copolymers, which combination gives a readily shapable, moldable composition which when molded has good initial color, long time stability under thermal stress, and low toxicity.

It is also an object of the invention to develop a stabilizer system which is comparable in effect to that disclosed in the above-mentioned U.S. patent application but which can be produced without the thioglycolates of monohydric or polyhydric alcohols.

It is a further object of the invention to provide a method of stabilizer molding compositions based upon polyvinyl chloride by incorporating therein, per 100 parts of polymer, among other ingredients, (a) from about 0.2 to 5 parts by weight of a synthetic, crystalline, powdered alkali metal aluminosilicate containing from about 13 to 25 percent by weight of water of crystallization, which has the composition

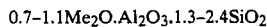

0.7–1.1Me$_2$O.Al$_2$O$_3$.1.3–2.4SiO$_2$ with respect to the anhydrous form, Me representing an alkali metal; and (b) from about 0.1 to 5 parts by weight of at least one co-stabilizer selected from the group consisting of β-diketones, α-ketoenol esters, α-acyllactones, substituted 1,4-dihydropyridine-3,5-dicarboxylic acids, and pyrrole, the pyrrole being unsubstituted or substituted in the 1-, 2-, and/or 3-position.

These and other objects of the invention will become more apparent in the description below.

DETAILED DESCRIPTION OF THE INVENTION

It has surprisingly been found that stabilizing results at least as good as those possible with the stabilizer system taught by the above-mentioned U.S. patent application can be achieved with the simultaneous use of a powdered, crystalline alkali metal aluminosilicate containing bound water and specifically selected, known, sulfur-free co-stabilizers in the system of non-toxic, alkali metal, alkaline earth metal, and/or zinc soaps. More particularly, the invention is directed to stabilized polyvinyl chloride molding mixtures containing a stabilizer system based upon alkali metal, alkaline earth metal, and/or zinc soaps as primary stabilizers as well as customary co-stabilizers (secondary stabilizers), powdered, crystalline, hydrous aluminosilicate, flow promoters and, optionally, other conventional additives, wherein the molding mixtures comprise, per 100 parts by weight of polymer, (a) from about 0.2 to 5 parts by weight of a synthetic, crystalline, powdered alkali metal aluminosilicate containing from about 13 to 25 percent by weight of water of crystallization, which has the composition

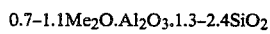

0.7–1.1Me$_2$O.Al$_2$O$_3$.1.3–2.4SiO$_2$ with respect to the anhydrous form, Me representing an alkali metal; and (b) from about 0.1 to 5 parts by weight of at least one co-stabilizer selected from the group consisting of β-diketones, α-ketoenol esters, α-acyl-lactones, substituted 1,4-dihydropyridine-3,5-dicarboxylic acids, and pyrrole, the pyrrole being unsubstituted or substituted in the 1-, 2-, and/or 3-position.

With regard to the co-stabilizers of component (b), the β-diketones represent an important sub-class, the diacyl methane compounds within that sub-class being especially important.

The above-mentioned U.S. patent application discloses molding compounds that are intended for the preparation of foils by the calender mill process. In addition to the initially mentioned components (a) to (e), the materials contain, per 100 parts by weight of polyvinyl chloride, from about 0.5 to 5 parts by weight of epoxidated soybean oil, from about 0.1 to 1 part by weight of high molecular ester wax, and from about 0.2 to 0.5 parts by weight of α-phenylindole or benzoylstearoyl methane. While a β-diketone compound is also used in this case, it is always in the presence of the thioglycolate of component (e) and together with epoxidated soybean oil and a higher molecular ester wax in a definite mixture. In contradistinction, stabilizer compositions according to the invention herein do not contain the thioglycolate of component (e), which had been considered essential. Preferably, no co-stabilizers containing thio compounds are used according to the invention. However, it is known that thio compounds other than thioglycolates can also have a co-stabilizing effect. See, for example, the β-thioketo esters disclosed in European patent application No. 4,826.

The details of the components of the polyvinyl chloride molding compositions according to the invention and the stabilizer systems to be used according to the invention in polyvinyl chloride molding compositions are described more fully as follows:

Polyvinyl Chloride Compounds

The invention is suitable for the stabilization of homopolymers or co-polymers of vinyl chloride. The co-polymers preferably contain at least 50 mol percent, especially at least 80 mol percent, of vinyl chloride. The mixed polymerization, or co-polymerization, components can comprise, in addition, vinyl esters such as vinyl acetate, preferably acrylic acid esters and vinylidene chloride. The polymers and/or mixed polymers can be prepared by known processes, such as suspension, emulsion, or block polymerization. Their K-value advantageously lies between about 35 and 80. The stabilization of resin mixtures containing mainly such polymers or co-polymers based upon vinyl chloride is within the scope of the invention.

The polyvinyl chloride molding mixtures stabilized by the process according to the invention are used mainly for the production of tubing and profiles by the extrusion method, for the production of hollow packaging materials, and for the production of rolled foils. According to the invention, the terminology polyvinyl chloride molding compositions, or mixtures, includes the semi-finished products used for molding as well as articles in any shape made from these compounds.

Metal Soaps as Primary Stabilizers

Suitable metal soaps include alkali metal compounds as well as alkaline earth metal compounds and/or corresponding zinc compounds. Potassium soaps can be of particular importance as representatives of the alkali metal compounds. The most important metal soaps are the corresponding alkaline earth metal compounds and/or zinc compounds. Primary stabilizers based upon calcium, zinc, and/or barium can have special significance. Preferably combinations of at least two salts or soaps are used, the combination of calcium/zinc soaps beings of particular importance. The combination of barium/zinc compounds also has relatively great significance.

Especially important are salts of the respective metals with saturated or unsaturated aliphatic carboxylic acids with up to 22 carbon atoms, especially salts of fatty acids with from 8 to 22 carbon atoms. Especially suitable for the preparation of food packaging materials or bottles are the respective salts of long-chain acids that are non-toxic and act as lubricants. Examples of preferred calcium and zinc salts of fatty acids are derived from fatty acids such as caprylic, capric, lauric, myristic, palmitic, and stearic acid. Salts of individual fatty acids as well as salts of mixtures of fatty acids, as can be especially obtained from natural fats and oils, are useful. The calcium and zinc salts of palmitic and stearic acid are used preferably.

Typically these stabilizers are added in amounts of from about 0.1 to 5 parts by weight, calculated per 100 parts by weight of the polymer compound. When mixtures of calcium and zinc salts are used, from about 1 to 30 parts by weight of calcium salt to from about 1 to 10 parts by weight zinc salt—again calculated per 100 parts by weight of the polyvinyl chloride—can be used in a suitable example. Optionally other barium compounds may be present, especially as alkylphenolates.

Powdered, Crystalline, Hydrous Aluminosilicate

The preferred synthetic crystalline aluminosilicates of the formula mentioned above are the corresponding sodium aluminosilicates. These aluminosilicates are well-known zeolites of the type NaA, which possess an average effective pore diameter of 4 Å, for which reason they are also called zeolites 4A. Such sodium aluminosilicates can be prepared by known methods. Suitable syntheses are described, for example, in U.S. patent application Ser. No. 458,306, filed Apr. 5, 1974, now abandoned in favor of continuation application Ser. No. 800,308, filed May 25, 1977, now abandoned in favor of continuation-in-part application Ser. No. 956,851, filed Nov. 2, 1978, now abandoned in favor of divisional applications Ser. Nos. 330,594, and 330,645, all filed Dec. 14, 1981 the former application now abandoned. Further details concerning the nature and production of these aluminosilicates can be found, for example in the following references: German Published Applications (DE-OS) No. 26 51 445 as well as U.S. Pat. Nos. 3,112,176, 4,303,626, 4,303,627, 4,303,628, 4,303,629 and 4,305,916, incorporated herein by reference.

The sodium aluminosilicates produced by precipitation and present in the form of a finely dispersed suspension can be converted from the amorphous to the crystalline state by heating to temperatures of from about 50° to 200° C. Then, the crystalline sodium aluminosilicate can be separated from the remaining aqueous solution by filtration and usually dried at temperatures of, for example, 50° to 200° C., until the water content is from about 13 to 25 percent by weight. The crystalline products described in U.S. patent application Ser. No. 458,306 and used herein according to the invention have a particular size in the range from about 0.1 to 50μ. Sodium aluminosilicates with a particle size of from about 0.1 to 20μ are preferably used for the performance of the process according to the invention. The calcium binding capacity of the sodium aluminosilicates, determined at 22° C., is at least 50 mg CaO/g anhydrous active substance and may attain values of about 200 mg CaO/g active substance. Preferably this calcium binding capacity is in the range of about 100 to 200 mg CaO/g active substance, being normally in the range of above 150 mg CaO/g. Details concerning the determination of the calcium binding capacity can be found in U.S. patent application Ser. No. 458,306 as well as in the text below. Crystalline sodium aluminosilicates with a particle size substantially in the range of from about 1 to 10μ are particularly preferred.

Sodium aluminosilicates with rounded corners and edges also may be used in a preferred embodiment of the process according to the invention. The preparation of such zeolites begins advantageously with a batch having a molar composition in the range

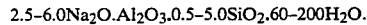

This batch is crystallized in a conventional manner. Advantageously, this is effected by heating the batch for at least one-half hour at from 70° to 120° C., preferably at from 80° to 95° C., under agitation. The crystalline product is isolated in a simple manner by separating the liquid phase. The products are re-washed with water, if required, and dried before further processing.

Those sodium aluminosilicates of small particle size that are insoluble in water and were precipitated and crystallized in the presence of water-soluble, inorganic or organic dispersing agent, may also be used in the process according to the invention. Products of this type are described in U.S. patent applications Ser. No. 503,467, filed Sept. 5, 1974, now abandoned; Ser. No. 763,667, filed Jan. 28, 1977, now abandoned; and Ser. No. 811,964, filed June 30, 1977, now U.S. Pat. No. 4,126,524. They are obtainable in a technically simple manner. Suitable water-soluble organic dispersing agents include tensides, non-surface-active aromatic sulfonic acids, and compounds having a complex-forming capacity for calcium. The dispersing agents may be introduced into the reaction mixture in any desired manner, before or during precipitation, and they may be introduced, for example, in the form of a solution or they may be dissolved in the aluminate solution and/or silicate solution. Particularly satisfactory effects are obtained when the dispersing agent is dissolved in the silicate solution. The quantity of dispersing agent should be at least about 0.05 percent by weight, preferably from about 0.1 to 5 percent by weight, based on the total amount of precipitate obtained. The product of precipitation is heated to temperatures of from 50° to 200° C. for from one-half to 24 hours for the crystallization. Examples of suitable dispersing agents include sodium lauryl ether sulfate, sodium polyacrylate, and the sodium salts of 1-hydroxy-ethane-1,1-diphosphonic acid.

The sodium aluminosilicates of the type NaA suitable for the performance of the process according to the invention contain from about 13 to 25 percent by weight of water of crystallization. Products with a water content in the range from about 18 to 25 percent by weight are preferably used.

Defined Co-stabilizers According to the Invention

The defined co-stabilizers used according to the invention as component (b) together with the aluminosilicates of component (a) are of themselves well-known classes of compounds. Their use for the stabilization of polyvinyl chloride molding compounds is the subject of several previous publications.

β-Diketones:

Reference can be made to U.S. Pat. Nos. 4,102,839, 4,123,400 and 4,123,399 all of which are incorporated herein by reference, for a description of useful β2-diketones. These compounds comprise organic compounds of the general formula

wherein $R^1$ and $R^3$, which may be the same or different, each represent a linear or branched alkyl or alkenyl having from 1 to 36 carbon atoms, an aralkyl group having from 7 to 36 carbon atoms, or an aryl group or cycloaliphatic group having less than 14 carbon atoms, the cycloaliphatic groups optionally containing carbon-carbon double bonds. These groups are unsubstituted or substituted with halogen atoms or, in the case of the aryl or cycloaliphatic groups, with methyl or ethyl groups. They can be further modified by the presence of one or more groupings selected from the group consisting of

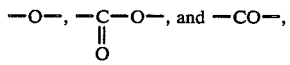

in the aliphatic chain. The $R^1$ and $R^3$ radicals together also can form a divalent alkylene with from 2 to 5 carbon atoms, which divalent alkylene may optionally contain an oxygen or nitrogen atom. The radical $R^2$ represents hydrogen; an alkyl or alkenyl having up to 36 carbon atoms, which alkyl or alkenyl may optionally contain one or more groupings selected from the group consisting of

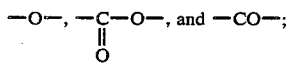

or a group of the formula

where $R^4$ is an alkyl group having from 1 to 36 carbon atoms, an aryl group, or a group of the general formula

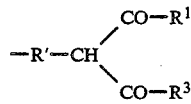

wherein R' represents an alkylene having from 1 to 6 carbon atoms. One of the substituents $R^1$ and $R^3$ can also represent hydrogen, and $R^1$ and $R^3$ together may represent a divalent group selected from the following: aralkylene groups having from 7 to 36 carbon atoms and arylene or cycloaliphatic groups having less than 14 carbon atoms, in which the cycloaliphatic groups optionally contain carbon-carbon double bonds. These groups can be either substituted or unsubstituted. Examples of suitable substituents include halogen or, in the case of aryl groups or cycloaliphatic groups, methyl or ethyl radicals. The divalent groups can also be modified by the presence of one or more groupings selected from the group consisting of

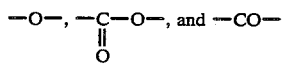

in the aliphatic chain.

β-Diketone compounds of the type mentioned can be used as individual compounds or as a mixture of several such compounds. The β-diketones that represent methane derivatives substituted with two acid radicals ($R^2$=H) are of special importance. A β-diketone compound that is particularly important within the scope of the invention is stearoylbenzoyl methane, but comparable methane derivatives with the varied acid radicals can be present instead or as well. Additional, suitable substituting acyl radicals are derived from, for example, lauric acid, myristic acid, palmitic acid, or behenic acid. The methane substituents can comprise identical or different acyl radicals of those mentioned above for the β-diketone compound.

α-Ketoenol Esters:

Useful α-ketoenol esters are described in French Pat. No. 2,383,987, incorporated herein by reference. Said α-ketoenol esters comprise enol esters of the general formula

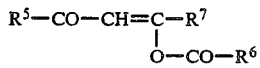

wherein $R^5$ and $R^7$ represent alkyl or alkenyl having from 1 to 36 carbon atoms, an aralkyl or aryl having from 7 to 36 carbon atoms, or a cycloalkyl having not more than 14 carbon atoms, or $R^5$ and $R^7$ together can form members of an ethylenically unsaturated ring. $R^6$ represents an alkyl having from 1 to 32 carbon atoms or an unsubstituted or substituted aryl.

α-Acyllactones:

According to U.S. Pat. No. 4,132,703 incorporated herein by reference, the use of certain organic compounds containing at least one α-lactone grouping as co-stabilizers is described. More specifically said compounds comprise compounds having groups of the formula

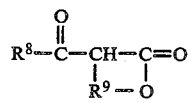

wherein $R^8$ represents an aliphatic radical having from 2 to 30 carbon atoms or an aromatic radical and $R^9$ represents a divalent linear or branched hydrocarbon having from 2 to 30 carbon atoms or a divalent cyclic hydrocarbon. $R^9$ can especially represent a grouping of the formula

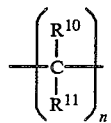

where n is an integer of from 2 to 6 and $R^{10}$ and $R^{11}$, which may be the same or different, each represent hydrogen, an alkyl, an aryl, or a hydrocarbon radical having from 1 to 30 carbon atoms and which may contain heteroatoms and/or functional groups, and where $R^{10}$ and $R^{11}$ on vicinal carbon atoms can together form a divalent saturated or unsaturated hydrocarbon radical, which together with the two vicinal carbon atoms forms a ring connected with the lactone ring. The α-acyllactone compounds contain preferably one or two acyllactone groups, especially one or two α-acyl-butyrolactone groups.

Substituted 1,4-Dihydropyridine 3,5-dicarboxylic Acids

As is disclosed in German published application (DE-AS) No. 24 36 007, incorporated herein by reference, esters of 1,4-dihydro-2,6-dimethylpyridine 3,5-dicarboxylic acid are useful as stabilizers or co-stabilizers for polyvinyl chloride. These stabilizers have the formula

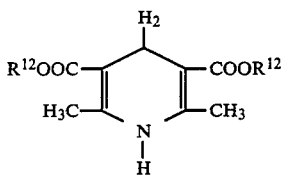

wherein $R^{12}$ represents a hydrocarbon radical. For example, $R^{12}$ may represent an alkyl, cycloalkyl, or aryl.

Pyrrole Compounds, Optionally 1-, 2-, and/or 3-Substituted

U.S. Pat. No. 4,290,940, incorporated herein by reference, describes pyrrole compounds useful as stabilizers for thermoplastic materials containing chlorine, particularly polyvinyl chloride. Said pyrrole compounds comprise compounds of the general formula

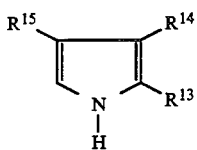

wherein $R^{13}$, $R^{14}$, and $R^{15}$ have the following significance: $R^{13}$ represents hydrogen, alkyl, cycloalkyl, aryl, alkoxycarbonylmethyl, optionally esterified α-hydroxyalkyl, optionally esterified α-hydroxycycloalkylmethyl, optionally esterified α-hydroxyaralkyl, alkoxymethyl, alkylthiomethyl, aryloxymethyl, arylthiomethyl, cycloalkoxymethyl, cycloalkylthiomethyl, aralkoxymethyl, aralkylthiomethyl, alkoxy, alkylthio, cycloalkoxy, cycloalkylthio, aralkoxy, arylalkylthio, aryloxy, arylthio, halogen, mercaptomethyl, or hydroxyl; $R^{14}$ represents hydrogen, alkyl cycloalkyl, aryl, optionally esterified α-hydroxyalkyl, in which case its alkyl, moiety can be akylene together with $R^{13}$, optionally esterified α-hydroxycycloalkylmethyl, optionally esterified α-hydroxyaralkyl, alkoxy, cycloalkyloxy, aralkoxy, aryloxy, alkylthio, cycloalkylthio, aralkylthio, arylthio, alkoxymethyl, alkylthiomethyl, aryloxymethyl, arylthiomethyl, cycloalkoxymethyl, cycloalkylthiomethyl, aralkoxymethyl, arylalkylthiomethyl, hydroxyl, or cyano, optionally carboxyl or acyl in form of the salt, in which case acyl can be —CO-alkylene together with $R^{13}$, in which —CO— is bound in the 3-position, or halogen or mercaptomethyl; and $R^{15}$ represents alkyl, cycloalkyl, aralkyl, aryl, optionally esterified hydroxymethyl, alkoxymethyl, alkylthiomethyl, cycloalkoxymethyl, cycloalkylthiomethyl, aralkoxymethyl, arylalkylthiomethyl, aryloxymethyl, arylthiomethyl, alkoxy, alkylthio, cycloalkoxy, cycloalkylthio, aralkoxy, aralkylthio, aryloxy, arylthio, halogen, or mercaptomethyl, or, when $R^{14}$ is carboxyl in the form of the salt, $R^{15}$ is hydrogen and $R^{13}$ has the meanings described above, or when $R^{15}$ is hydroxyl and $R^{13}$ is hydrogen, alkyl, or aryl, $R^{14}$ is hydrogen, alkyl, aryl, or acyl or a salt thereof, as described. For preferred meanings for the radicals $R^{13}$, $R^{14}$, and $R^{15}$, reference should be made to U.S. Pat. No. 4,290,940, particularly claims 2 to 9 thereof.

These co-stabilizers of component (b) according to the invention used together with the sodium aluminosilicates of component (a), that is, the β-diketones, the ketoenol esters, the acyllactones, the dihydropyridine dicarboxylic acid esters, and/or the pyrrole compounds, can be obtained by the methods given in the literature cited. The co-stabilizers can be used in the form of individual, defined compounds, as mixtures of several compounds from one of the mentioned classes of substances, or as mixtures of several compounds of several of the mentioned classes of substances. As indicated before, the β-diketone compounds are of special significance.

Other Optional Co-stabilizers

Optionally other conventional co-stabilizers for polyvinyl chloride systems can be used together with the metal salts acting as primary stabilizers, the aluminosilicates of component (a) and the defined co-stabilizers of component (b) selected according to the invention. Such conventional stabilizers are disclosed in, for example, L. I. Nass, "Encyclopedia of PVC", Marcel Dekker Inc., New York-Basel, 1976/1977. Special reference is made to Volume I, pages 308–309, incorporated herein by reference.

The flow promoters described below are also frequently included in the group of conventional co-stabilizers, and their function overlaps that of these components.

Flow Promoters

The above-mentioned U.S. patent application Ser. No. 194,851 describes partial esters of polyol as component (d), which can be particularly suitable co-stabilizing flow promoters according to the invention. These are partial esters of fatty acids having from 8 to 22 carbon atoms and polyols having from 2 to 6 carbon atoms and from 2 to 6 hydroxyl hydroxyl groups, containing an average of at least one free polyol hydroxyl group per molecule. They are prepared in known manner by esterification of polyols having from 2 to 6 carbon atoms and from 2 to 6 hydroxyl groups with fatty acids with a chain length of from 8 to 22 carbon atoms, in which conventional esterification catalysts may also be used. For this purpose, polyols and fatty acids are reacted at a molar ratio of from 1:1 to 1:(n−1), n standing for the number of hydroxyl groups in the polyol. The reaction partners are advantageously used in amounts such that partial esters with an OH-number of from about 140 to 580, preferably from about 170 to 540, are formed. The reaction product, which represents a mixture of different esters, should have an acid number less than 15, preferably less than 8.

Suitable polyol components include, for example, ethylene glycol, 1,2-propylene glycol, 1,3-propylene glycol, 12,-butylene glycol, 1,4-butylene glycol, 1,6-hexanediol, neopentyl glycol, glycerol, trimethylolethane, trimethylolpropane, pentaerythritol, dipentaerythritol, erythritol, mannitol, and sorbitol. Particularly significant polyol components have from 3 to 6 hydroxyl groups, preferably 3 or 4 hydroxyl groups. In the context of the invention herein, the use of glycerol or pentaerythritol is particularly advantageous. Caprylic, caproic, lauric, myristic, palmitic, stearic, and behenic acid are examples of suitable fatty acid components. Synthetic fatty acids of the above-mentioned chain length, such as montanic acid, unsaturated acids such as oleic and linolenic acid, and substituted fatty acids, particularly 12-hydroxystearic acid, may also be used. For practical reasons, mixtures of fatty acids from natural fats and oils are used most frequently. This component may also consist of a mixture of the above-mentioned partial esters. Especially preferred compounds of this flow promoter component may comprise partial esters of polyols with from 3 to 6 hydroxyl groups, preferably 3 or 4 hydroxyl groups, and the fatty acids described, the partial esters having an average of from 2 to 3 free hydroxyl groups.

Other suitable flow promoters include the complex esters or complex ester mixtures described in German published application (DE-AS) No. 19 07 768 and German published application (DE-OS) No. 23 06 744 and U.S. Pat. No. 3,875,069, incorporated herein by reference. The German published application (DE-AS) No. 19 07 768 describes mixed esters with hydroxyl or acid numbers of from 0 to 6 of (i) aliphatic, cycloaliphatic, and/or aromatic dicarboxylic acids,
(ii) aliphatic polyols, and
(iii) aliphatic monocarboxylic acids with 12 to 30 carbon atoms in the molecule.

Component (ii) preferably contains from 2 to 6 hydroxyl groups in the molecule, and component (i) preferably contains from 2 to 22 carbon atoms in the molecule. The preferred mixed esters contain the components (i), (ii), and (iii) at a molar ratio of approximately $$(n-1):n:nm-2(n-1)$$

wherein n represents a whole number of from 2 to 11 and m represents the number of hydroxyl groups in the polyol. Especially suitable are mixed esters that contain as component (i) adipic acid, as component (ii) pentaerythritol, and as component (iii) stearic acid or oleic acid.

Additional data for suitable flow promoters can be found in the above-mentioned German published applications (DE-OS) No. 23 06 755 and U.S. Pat. No. 3,875,069.

Also suitable as flow promoters are wax esters, that is, esters of monocarboxylic acids and monoalcohols with longer chains. The sum of the carbon atoms of these esters is preferably in the range from about 28 to 70, especially in the range from about 30 to 50. Especially important components with respect to the alcohol moiety as well as the carboxylic acid moiety are the respective compounds with from 18 to 22 carbon atoms.

Other suitable known flow promoters include carboxylic acids such as stearic acid, mineral waxes, primary and secondary, saturated and unsaturated higher alcohols with especially from 16 to 44 carbon atoms in the molecule, oxidized polyethylene and, further, components that are enumerated, for example, in L. I. Nass, "Encyclopedia of PVC", for example, Volume II, pages 644 et seq., particularly page 651.

Other Conventional Constituents

In addition to the above-mentioned components, other conventional additives can be present, depending on the intended purpose. In hard polymers, additives for the improvement of the impact resistance, pigments, and/or fillers can be provided. Soft polymers can contain one or more softening agents or plasticizers, inorganic or organic pigments, and/or fillers. Antioxidants and UV-stabilizers may generally be added to the mixture.

With regard to antioxidants, sterically-hindered phenols, such as 2,6-disubstituted phenol compounds, can be of special importance. The substituents present in the 2- and 6-positions can especially be space-filling groups such as tert.alkyl groups, particularly the tert.butyl group. The phenol compounds frequently have an additional alkyl substituent, particularly the methyl substituents, in the 4-position. A particularly suitable substituted phenol is 2,6-di-tert.butyl-4-methyl phenol.

The well-known additives can be used in usual amounts, for example, in amounts of from about 0.1 to 20 parts by weight per 100 parts by weight polyvinyl chloride resin compound.

In a preferred example of the invention, $\beta$-diketones of component (b) are used together with epoxidated soybean oil. In this case, the use of from about 0.2 to 0.5 parts by weight of the $\beta$-diketone and from about 0.5 to 5 parts by weight of the epoxidated soybean oil per 100 parts by weight of the polyvinyl chloride resin can be advantageous. The concurrent use of a high molecular ester wax and/or a partial ester, such as the components mentioned as flow promoters above, is also preferred in this instance. The amount of this component can preferably be from about 0.1 to 2 parts by weight, especially from about 0.1 to 1 part by weight, per 100 parts by weight of polyvinyl chloride resin in this case.

The individual components of the polyvinyl chloride molding compounds according to the invention can be combined by mixing the constituents in conventional mixers. Here, it is possible to mix the several components of the stabilizer mixture first and to then combine this stabilizer mixture with the polyvinyl chloride molding compound.

Another aspect of the invention concerns the stabilizer mixtures themselves, which are suitable for subsequent combination with the polyvinyl chloride compounds. The following is applicable:

The basic components, that is, aluminosilicates, co-stabilizer selected according to the invention and light metal soap, are present in the mixtures in the following ratios:

from about 4 to 100 parts by weight of synthetic, crystalline, powdered aluminosilicated, which contains from 13 to 25 percent by weight bound water, and has the composition described above, from about 1 to 50 parts by weight of at least one of known co-stabilizers selected from the group consisting of $\beta$-diketones, $\alpha$-ketoenol esters, $\alpha$-acyllactones, substituted 1,4-dihydropyridine-3,5-dicarboxylic acid, and pyrrole, optionally substituted in the 1-, 2-, and/or 3-position, from about 1 to 150 parts by weight of calcium soaps, and from about 1 to 100 parts by weight of zinc soaps.

The preferred co-stabilizers are the $\beta$-diketones, especially diacyl methane compounds. The more detailed descriptions given above also apply to the other components.

The stabilizer mixtures of the invention preferably contain at least one flow promoter from the class of the partial esters of fatty acids with from 8 to 22 carbon atoms and polyols with from 2 to 6 carbon atoms and from 2 to 6 hydroxyl groups, which contain an average of at least one free polyol hydroxyl group per molecule. The flow promoter is present in the stabilizer mixture in amounts of from about 4 to 100 parts by weight.

In another preferred embodiment, the stabilizer mixtures of the invention also contain epoxidated soybean oil, advantageously in amounts of from about 1 to 300 parts by weight. Finally, the concurrent use of phenols with steric hindrance in an amount of from about 1 to 20 parts by weight can be advantageous in the stabilizer mixtures according to the invention.

The stabilizer mixtures according to the invention can be obtained by simple mechanical mixing of the constituents in conventional mixers. They usually are obtained in the form of free-flowing dust-free products by this method.

The following examples are intended to illustrate the invention and should not be construed as limiting the invention thereto.

EXAMPLES

Example 1

One hundred parts by weight of suspension-PVC (K value=70) were mixed with the following components:

| Component | Parts by Weight |
| --- | --- |
| Calcium stearate | 0.8 |
| Zinc stearate | 0.4 |
| Sorbitol | 0.1 |
| Stearoylbenzoyl methane | 0.5 |
| Epoxidated soybean oil | 3.0 |
| Fatty alcohols | 1.0 |
| Montan wax | 0.7 |
| Zeolite NaA | 0.5 |

The effect of the stabilizer combinations was tested with the "static thermostability" of rolled sheets in this case and in the following examples. For this purpose, polyvinyly chloride molding mixtures (Heraeus FT 420 R) containing stabilizer mixtures were processed into test sheets on a laboratory rolling mill with the dimensions 450×220 mm (by Berstorff) at a roller temperature of 170° C. and a roller rotation of 12.5 rpm, in sychronization, within a period of 5 minutes. The sheets, which had a thickness of approximately 0.5 mm, were cut into square test samples with a length of 10 mm for the edges and then exposed to a temperature of 180° C. in a drying chamber (Heraeus FT 420 R) with 6 rotating shelves. Samples were removed at intervals of 15 minutes, and their changes in color were evaluated. In the evaluations hereinafter, the initial color is recorded as related to the stabilizer mixture added, followed by the time after which the test was concluded because of excessive discoloration, that is, loss of stability or stability breakdown.

For the above-mentioned mixture, the initial color was "almost colorless", and the loss of stability occurred after 140 minutes.

Example 2

The following mixture was prepared:

| Component | Parts by Weight |
| --- | --- |
| Suspension-PVC (K-value = 70) | 100 |
| Calcium stearate | 1.0 |
| Zinc stearate | 0.5 |
| Stearic acid | 0.2 |
| Paraffin wax | 0.2 |
| Pentaerythritol partial ester of stearic acid | 0.5 |

The stability of this mixture, which was designated as a "null sample," was determined as described in Example 1. Other stabilizer additives were mixed with the null sample in subsequent experiments. The results obtained with these mixtures are set forth in the following table:

TABLE I

| Sample | Additive | Amount of Additive (parts by weight) | Initial Color | Stability Breakdown (min.) |
| --- | --- | --- | --- | --- |
| Null | — | — | light pink | 40 |
| A | stearoylbenzoyl methane | 1 | almost colorless | 40 |
| B | Zeolite NaA | 0.5 | light pink | 60 |
| C | Zeolite NaA | 1 | light pink | 70 |
| D* | stearoylbenzoyl methane | 0.5 | almost colorless | 60-70 |
|  | Zeolite NaA | 0.5 |  |  |

*according to the invention

Example 3

The following mixture was prepared:

| Component | Parts by Weight |
| --- | --- |
| Suspension-PVC (K-value = 70) | 100 |
| Calcium stearate | 0.5 |

The stability of this mixture, which was designated as a "null sample," was determined as described in Example 1. Other stability additives were mixed with the null sample in subsequent experiments. The results obtained with these mixtures are set forth in the following table:

TABLE II

| Sample | Additive | Amount of Additive (parts by weight) | Initial Color | Stability Breakdown (min.) |
| --- | --- | --- | --- | --- |
| Null | — | — | pink | 10 |
| A | benzoylisooctanoyl methane | 0.3 | pink | 10 |
| B | high molecular ester wax (flow promoter) | 0.5 | pink | 10 |
|  | benzoylisooctanoyl methane | 0.3 |  |  |
| C | high molecular ester wax (flow promoter) | 0.5 | light yellow | 30 |
|  | zinc stearate | 0.3 |  |  |
| D | zinc stearate | 0.3 | almost colorless | 30 |
|  | benzoylisooctanolyl methane | 0.3 |  |  |
| E | high molecular ester wax (flow promoter) | 0.5 |  |  |
|  | zinc stearate | 0.3 | almost colorless | 30 |
|  | benzoylisooctanoyl methane | 0.3 |  |  |
| F | high molecular ester wax (flow promoter) | 0.5 |  |  |
|  | zinc stearate | 0.3 | almost colorless | 30 |
|  | benzoylisooctanoyl methane | 1.3 |  |  |
| G* | high molecular ester wax (flow promoter) | 0.5 |  |  |
|  | zinc stearate | 0.3 | almost colorless | 100 |
|  | benzoylisooctanoyl methane | 0.3 |  |  |
|  | Na-Aluminosilicate | 1.0 |  |  |

TABLE II-continued

| Sample | Additive | Amount of Additive (parts by weight) | Initial Color | Stability Breakdown (min.) |
|---|---|---|---|---|
| | with 19% H$_2$O (Zeolite type NaA) | | | |
| H* | high molecular ester wax (flow promoter) | 0.5 | | |
| | zinc stearate | 0.3 | | |
| | benzoylisooctanoyl methane | 0.3 | | |
| | Na-Aluminosilicate with 19% H$_2$O (Zeolite type NaA) | 1.0 | almost colorless | 100 |
| | pentaerythritol partial ester of stearic acid | 0.1 | | |
| I* | high molecular ester wax (flow promoter) | 0.5 | | |
| | zinc stearate | 0.3 | | |
| | benzoylisooctanoyl methane | 0.3 | | |
| | Na-Aluminosilicate with 19% H$_2$O (Zeolite type NaA) | 1.0 | almost colorless | 120 |
| | pentaerythritol partial ester of stearic acid | 1.0 | | |
| J* | high molecular ester wax (flow promoter) | 0.5 | | |
| | zinc stearate | 0.3 | | |
| | benzoylissoctanoyl methane | 0.3 | almost colorless | 120 |
| | Na-Aluminosilicate with 19% H$_2$O (Zeolite type NaA) | 1.0 | | |
| | 2,6-di-tert.butyl-4-methyl phenol | 0.1 | | |
| K* | high molecular ester wax (flow promoter) | 0.5 | | |
| | zinc stearate | 0.3 | | |
| | benzoylissoctanoyl methane | 0.3 | almost colorless | 140 |
| | Na-Aluminosilicate with 19% H$_2$O (Zeolite type NaA) | 1.0 | | |
| | 2,6-di-tert.butyl-4-methyl phenol | 0.1 | | |
| | epoxidated soybean oil | 3.0 | | |

*according to the invention

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In a stabilized polyvinyl chloride molding mixture containing a stabilizer combination based upon alkali metal, alkaline earth metal, and/or zinc soaps, powdered, crystalline, hydrous aluminosilicate, and flow promoters, the improvement which comprises, per 100 parts by weight of polyvinyl chloride, (a) from about 0.2 to 5 parts by weight of a synthetic, crystalline, powdered alkali metal aluminosilicate containing from about 13 to 25 percent by weight of water of crystallization, which has the composition $$0.7\text{-}1.1Me_2O.Al_2O_3.1.3\text{-}2.4SiO_2$$

wherein Me represents an alkali metal, with respect to the anhydrous form; and (b) from about 0.1 to 5 parts by weight of at least one compound selected from the group consisting of β-diketones of the formula $$R^1\text{—}CO\text{—}CHR^2\text{—}CO\text{—}R^3$$

wherein $R^1$ and $R^3$, which may be identical or different, each represent a linear or branched alkyl or alkenyl having from 1 to 36 carbon atoms, an aralkyl having from 7 to 36 carbon atoms, or an aryl or cycloaliphatic having less than 14 carbon atoms, the cycloaliphatic group optionally being olefinically unsaturated and $R^1$ and $R^3$ being unsubstituted or substituted, and $R^2$ represents hydrogen or an alkyl or alkenyl of from 1 to 36 carbon atoms, and $R^1$ and $R^2$ may form a divalent alkylene with from 2 to 5 carbon atoms.

2. The molding mixture of claim 1, wherein the metal soaps are present in an amount of from about 0.1 to 5 parts by weight.

3. The molding mixture of claim 2, wherein the metal soaps comprise the salts of higher saturated or unsaturated fatty acids.

4. The molding mixture of claim 1, wherein the metal soaps comprise fatty acid soaps of calcium, zinc, and/or barium and barium is optionally present as the alkylphenolate.

5. The molding mixture of claim 1, wherein the powdered, crystalline, hydrous aluminosilicate has a particle size of from about 0.1 to 20μ.

6. The molding mixture of claim 5, wherein the particle size is from about 1 to 10μ.

7. The molding mixture of claim 1, wherein component (a) comprises sodium aluminosilicate with a water content of from about 18 to 25 percent by weight.

8. The molding mixture of claim 1, wherein component (a) is zeolite 4A containing bound water.

9. The molding mixture of claim 1, wherein from about 0.1 to 5 parts by weight of epoxidated soybean oil are present.

10. The molding mixture of claim 1, wherein from about 0.2 to 2.0 parts by weight of partial esters of fatty acids with from 8 to 22 carbon atoms and polyols with from 2 to 6 carbon atoms and from 2 to 6 hydroxyl groups, which have an average of at least one free polyol hydroxyl group, are present as a co-stabilizer with flow promoting properties.

11. The molding mixture of claim 1, wherein a wax ester formed from a monovalent acid with longer chains and corresponding alcohols and having a total of from about 28 to 70 carbon atoms, is present as a flow promoter.

12. The molding mixture of claim 11, wherein the ester has from about 30 to 50 carbon atoms.

13. The molding mixture of claim 1, wherein component (b) is a diacyl methane compound.

* * * * *

UNITED STATES PATENT AND TRADEMARK OFFICE
CERTIFICATE OF CORRECTION

PATENT NO. : 4,590,233

DATED : May 20, 1986

INVENTOR(S) : WERNER ERWIED et al.

It is certified that error appears in the above-identified patent and that said Letters Patent is hereby corrected as shown below:

Column 6, line 51, "62-dike-" should read -- β-dike- --.

Column 9, line 37, "alkyl cycloalkyl" should read -- alkyl, cycloalkyl --.

Column 9, line 38, "alkyl, moiety" should read -- alkyl moiety --.

Column 12, line 39, "aluminosilicated" should read -- aluminosilicate --.

Signed and Sealed this

Second Day of September 1986

[SEAL]

Attest:

DONALD J. QUIGG

Attesting Officer   Commissioner of Patents and Trademarks